May 2, 1950 P. M. SIVERTSEN 2,505,797
MEAT CHOPPER
Filed April 29, 1949 2 Sheets-Sheet 1
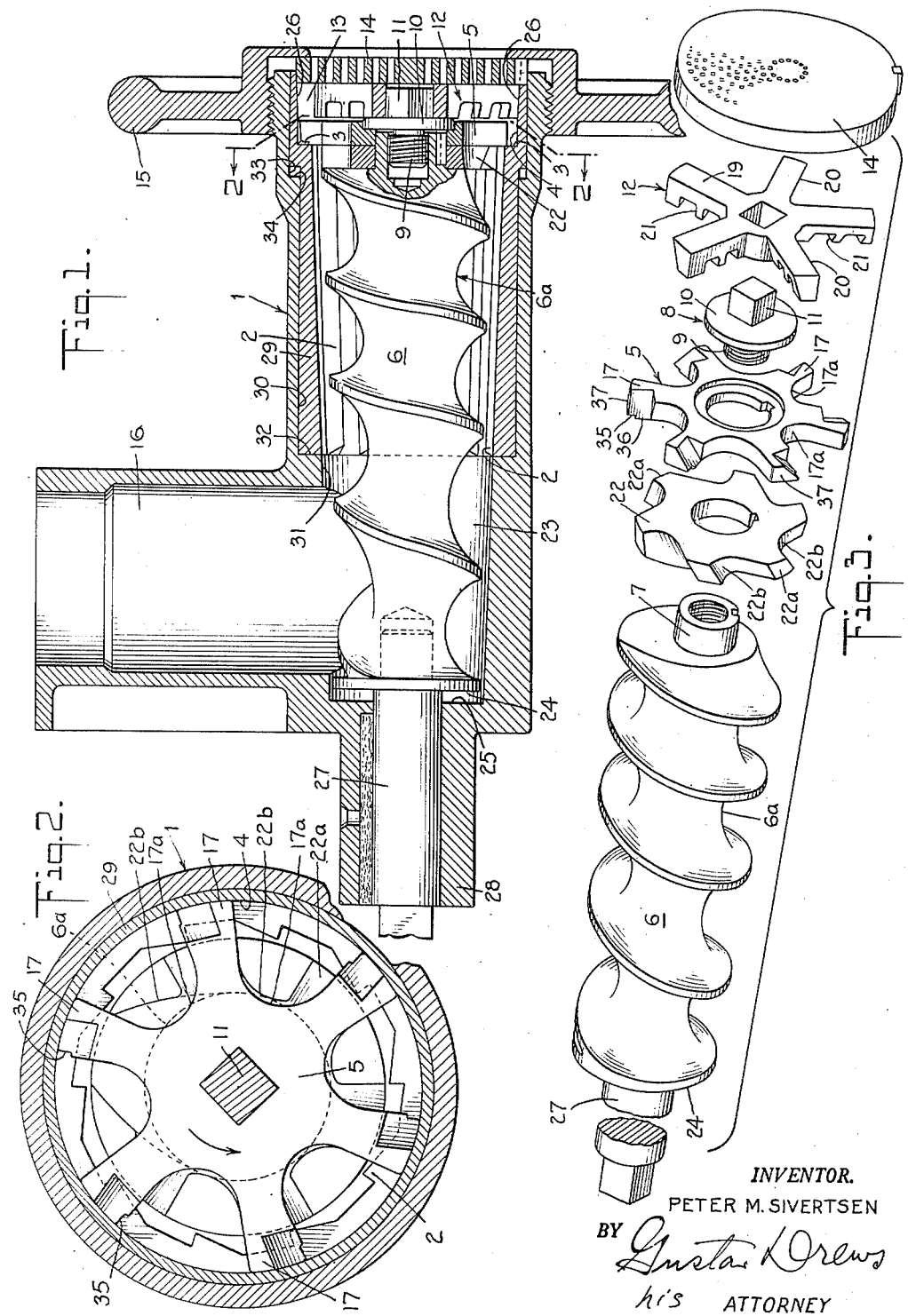
INVENTOR.
PETER M. SIVERTSEN
BY Gustav Drews
his ATTORNEY May 2, 1950 P. M. SIVERTSEN 2,505,797
MEAT CHOPPER
Filed April 29, 1949 2 Sheets-Sheet 2
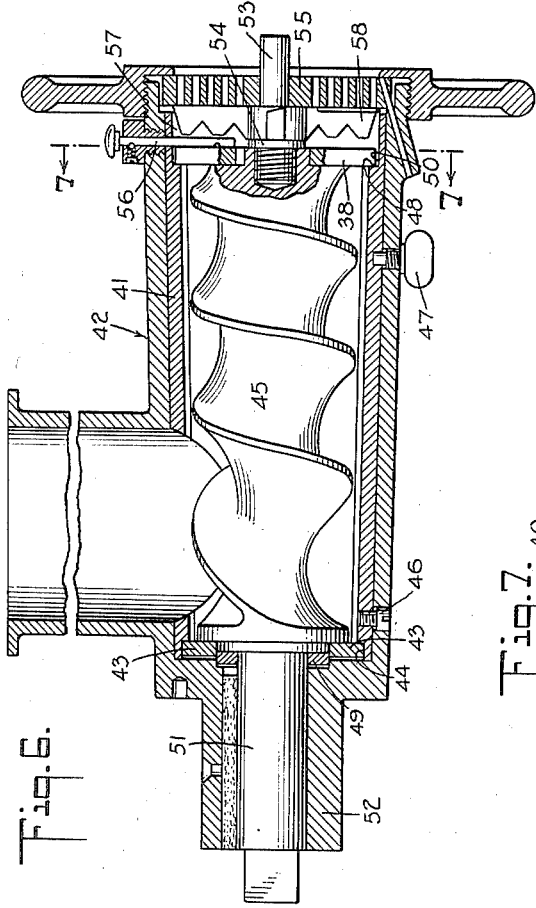
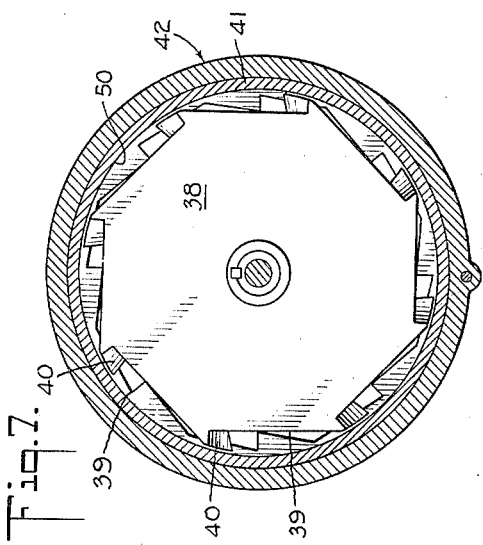
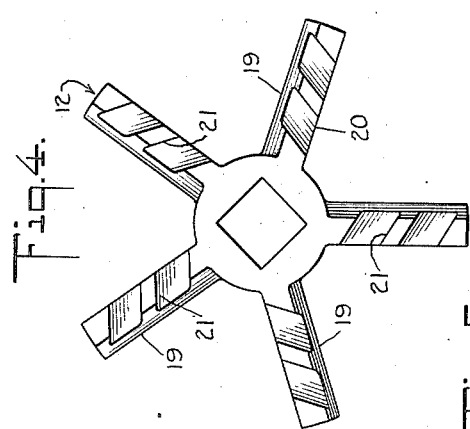
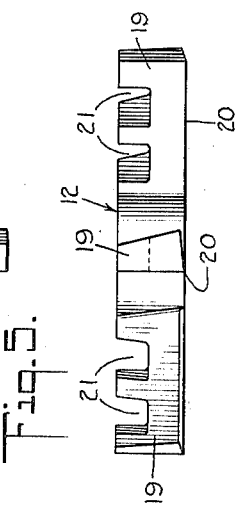
INVENTOR
PETER M. SIVERTSEN
BY Gustav Drews
his ATTORNEY Patented May 2, 1950

2,505,797

UNITED STATES PATENT OFFICE 2,505,797

MEAT CHOPPER

Peter M. Sivertsen, Greenwich, Conn., assignor to Globe Slicing Machine Co., Inc., Stamford, Conn., a corporation of New York Application April 29, 1949, Serial No. 90,290

9 Claims. (Cl. 146—187)

This invention relates to meat choppers, and the present application constitutes in part a continuation of my co-pending application for patent Serial No. 5,090, filed January 29, 1948 now abandoned.

In the heat choppers heretofore in use, the meat is comminuted by forcing chunks of meat through a perforated extrusion plate over the surface of which a rotary knife is passed. When, as is usual, such machines are used to chop meat containing a portion of fat or gristle, the chopped meat comes out in streaks or strips of white and red, indicating that the fat and lean are not mixed. It is, therefore, usual to pass such meat through the machine a second time. This effectively mixes the fat and lean but it involves delay and extra trouble, and has the undesirable effect of producing meat of a pale appearance because a large part of the juice contained in the original meat is expressed by the two successive extrusions to which the meat has been subjected.

It has been proposed to avoid the delay and trouble of passing the meat through the machine twice by providing machines in which the meat is passed successively through two extrusion plates and mixed in its passage between the two plates. Such machines produce a pale product deprived of a large part of its juice, like the product obtained by passing the meat twice through a conventional machine. Furthermore, such machines are so complicated and inconvenient to clean that they have never come into practical use.

The object of my invention is to produce a meat chopper capable of producing in a single passage through the machine a ground meat product in which the fat and lean are well mixed and in which a large part of the original juice contained in the meat is retained, giving the product a dark red color.

A meat grinder in accordance with my invention is provided with the usual extrusion plate at its outer end, but differs from the conventional meat chopper in that it contains means for feeding the meat to the perforated plate in the form of mixed small ragged uncompressed pieces. In passing through the machine, chunks of meat are first cut into small ragged uncompressed pieces which contain all the juice of the original meat. By mixing these pieces before the final extrusion, a well-mixed product is obtained without the necessity for two successive extrusions. Furthermore, the small pieces pass through the extrusion plate more easily than large chunks of meat. As a result, the final product contains a large part of the original juice contained in the meat.

A machine embodying my invention has a casing providing a passage for the meat and having at its outer end a perforated extrusion plate. The passage is provided with longitudinal ribs which terminate in cutting edges at a distance from the end of the passage so as to provide a space between the ribbed portion of the passage and the extrusion plate. This space serves as a mixing chamber. In the ribbed portion of the passage is a feed screw which forces the meat forward while it is held against rotation by the ribs, and urges it in the channels between the ribs. A rotary cutter with widely spaced teeth is mounted at the end of the feed screw and cooperates with cutting edges at the ends of the ribs in tearing the meat into small ragged uncompressed pieces as it emerges from the channels between the ribs. These pieces are mixed by a rotary mixer in the mixing chamber and then passed through the extrusion plate at the end of the passage.

These and other features, capabilities and advantages of the invention will appear from the subjoined detailed description of specific embodiments thereof illustrated in the accompanying drawings, in which:

Fig. 1 is a transverse section of one embodiment of the improved meat chopper.

Fig. 2 is a section on the line 2—2 of Fig. 1.

Fig. 3 is an exploded view of the operating parts mounted in the casing.

Fig. 4 is a rear elevation of the combination cutter and mixer.

Fig. 5 is an end elevation of the unit illustrated in Fig. 4.

Fig. 6 is a transverse section of another embodiment of the improved meat chopper.

Fig. 7 is a section on the line 7—7 of Fig. 6.

In the embodiment shown in Figs. 1 to 5, inclusive, there is provided a casing 1 having a ribbed inner periphery forming flutes defined by the longitudinally extending ribs 2 and a front annular recess defined by the shoulder 3 and a cylindrical bearing face 4 to receive the cutter 5 fixed in the present instance to the front end of the worm or feed screw 6 rotatably mounted in the casing 1 to advance the food particles to be cut toward the cutter 5. The cutter 5 is preferably fixed to the worm 6, being mounted on the stub shaft 7 and keyed thereto against rotation, and then anchored in place by the connecting means 8 having the threaded portion 9 screw threadedly connected to the stub shaft 7, the collar 10 engaging the outer face of the cutter 5 and an angular projection 11 providing a non-circular seat for the unit 12 constituting not only a mixer in the chamber 13 formed between the cutter 5 and the extrusion or perforated disk 14, but also a second cutter in engagement with the inner face of the disk 14. While the cutter 5 is thus fixed to the worm 6 by the connecting means 8, the unit 12 is fixed to rotate with the worm 6, but otherwise readily removable from the non-circular seat 11 when the perforated disk 14 is removed from the discharge end of the casing 1. The disk 14 is keyed to the outer end of the casing 1 and thus fixed against rotation with the worm 2 and anchored in place with the unit 12 by the conventional locking ring 15, screw threadedly connected to the outer peripheral front end of the casing 1.

In operation, if the food to be cut consists of chunks of meat, the same are fed to the feed screw 6 in the casing 1 through the conventional chute 16, the ribs 2 holding or anchoring the meat against rotation with the worm 6, the worm 6 thus cooperating in the conventional way with the ribs 2 to advance the chunks of meat to the cutter 5. The cutter 5 has widely spaced peripheral teeth 17, so provided in order to avoid any substantial compression of the meat in the preliminary cutting operation, which teeth 17 coact with the cutting edges formed by the ends of the ribs 2 at the shoulder 3 to shear the meat and thus advance the meat to the disk 14 in small ragged uncompressed pieces. In the chamber 13, the unit 12 constituting a mixing member having intersecting arms 19 will thoroughly intermingle and mix the food particles as they pass between said cutter 5 and the disk 14. The cutter 5 thus prepares the chunks of meat into small ragged uncompressed pieces which will readily pass through the disk 14.

Excellent results have been achieved when the intersecting arms 19 of the unit 12 have sharp front cutting edges 20 in contact with the perforated disk 14 to serve as a final cutter and the arms 19 also have notched rear edges 21 contributing to the mixing action of the arms as mixers. Furthermore, an additional rotary toothed cutter 22 may be provided having a radius less than the distance from the axis of the passage 23 in the casing 1 to the inner edges of the ribs 2 and located in the ribbed passage 23 for exercising a tearing action on the mass of meat while it is retained against rotation by the ribs 2.

The shoulder 3 also serves as an end thrust for the worm 6 and cutter 5, the rear edges of the teeth 17 riding in engagement with the same and absorbing the full end thrust, since, as will appear from Fig. 1, the rear face 24 of the worm 3 is spaced from the rear face 25 of the chamber 23. The face 4, on the other hand, is engaged by the outer peripheral edges of the teeth 17 to absorb the radial thrust of the worm 6 and cutter 5. The face 26 to the front of the face 4 preferably flares outwardly to facilitate assembly.

The worm 6 in the present instance has connected thereto a driven shaft 27 which is rotatably mounted in the diminished extension 28 extending rearwardly from the casing 1.

The ribs 2 and shoulder 3 may be provided as shown in Fig. 1 in a separate sleeve 29 which is press fit into the casing 1. The casing 1 for this purpose is stepped in its inner periphery. It has an intermediate chambered cylindrical portion 30 defined from the smaller chambered cylindrical portion 31 by the shoulder 32. The casing 1 has an outer chambered cylindrical portion 33 of greater diameter than the chambered cylindrical portion 30 and defined from the chambered portion 30 in the present instance by the shoulder 34.

Preferably as shown in Figs. 2, 3, the teeth 17 of the cutter 5 have notches 35 between the rear face 36 and outer periphery 37. These notches 35 enable some of the juices of the meat to spread over the end thrust face 3 and radial thrust face 4 to serve as a lubricant for the same, since of course in order to protect the meat from contamination by foreign matter, it would not be feasible to supply any extraneous lubricant to these faces 3 and 4.

The inner periphery of the ribbed portion of the sleeve 29, and the inner periphery of the portion 31 preferably flare outwardly as shown as they approach the discharge end of the casing 1. The formation of the ribs 2 on a separate sleeve 29 is provided to facilitate the making of the ribs 2 of a material which may be formed into hard cutting edges at the ends of the ribs 2. The outer periphery of the sleeve 29 is stepped as shown to register with the stepped formation of the casing 1 defined by the inner peripheries of the cylindrical portions 30 and 33.

It should be noted that, in the preferred embodiment shown in Figs. 1 to 5, the recesses 22b between the teeth 22a of the preliminary tearing cutter 22 are as deep as the trough 6a of the feed worm, while the recesses 17a between the teeth 17 of the cutter 5 are still deeper and communicate directly with the trough 6a in the feed screw through the recesses 22b. This arrangement has the advantage of avoiding all compression on the meat during the preliminary cutting.

While less desirable, it has in some cases proved possible to cut the meat into substantially uncompressed pieces even though the meat is slightly compressed as it is brought to the cutter. In such cases, the embodiment shown in Figs. 6 and 7 may be used. Here the cutter 38 differs from the cutter 5 in that the recesses between the teeth 40 are shallower.

The embodiment shown in Figs. 6 and 7 differs from the preferred embodiment of Figs. 1 to 5 in some other respects. Here the sleeve 41 extends the full length of the casing 42 having a removable collar 43 mounted in the recess 44 at its rear, which collar 43 is disposed adjacent to the rear end of the worm or feed screw 45 rotatably mounted in the sleeve 41, the sleeve 41 being removably secured in the present instance to the casing 42 by the screws 46 and 47.

Furthermore, while the shoulder 48 may supplement the bearing ring 49 in absorbing the end thrust, the radial thrust is not absorbed by the cooperation of the outer peripheries of the teeth 40 with the inner cylindrical face 50, the teeth 40 rotating free of the face 50. In this embodiment the shaft member 51 rotating in the diminished bearing extension 52 and the shaft member 53 of the connecting device 54 rotating in the central opening formed in the extrusion disk 55, are relied upon to take up this radial thrust.

It may also be desirable to mention that a fixed finger 56 extending into the chamber 57 may be used to supplement the unit 58 in mixing the meat particles as they pass from the cutter 38 to the extrusion disk 55. The preliminary tearing cutter, such as the cutter 22 of Fig. 3, is omitted in this embodiment.

It is obvious that various changes and modifications may be made to the details of construction without departing from the general spirit of the invention as set forth in the appended claims.

I claim:

1. A meat chopper having a casing providing a passage, a perforated plate fixed in the end of the passage and rotary cutting blades in contact with the face of the perforated plate, characterized by means for feeding the meat to said perforated plate in the form of small ragged uncompressed pieces, such means including longitudinal ribs on the wall of the passage terminating in cutting edges at a distance from the end of the passage, a rotary feed worm located within the ribbed portion of the passage, a rotary cutter located at the longitudinally outer end of the ribbed portion of the passage and having widely spaced peripheral teeth coacting with the cutting edges formed by the ends of the ribs to shear the meat, and said rotary blades constituting a rotary mixer within the unribbed end of the passage between said longitudinal ribs and said perforated plate.

2. A meat chopper as claimed in claim 1 in which the rotary mixer and the rotary cutting blades in contact with the perforated plate consist of a plurality of spaced arms having sharp front edges in contact with the perforated plate and notched rear edges acting as mixers.

3. A meat chopper as set forth in claim 1 having a rotary toothed cutter having a radius less than the distance from the axis of the passage to the inner edges of the ribs and located within the ribbed passage for exercising a tearing action on the mass of meat while it is retained against rotation by the ribs.

4. The combination of a casing, a sleeve secured to said casing and forming with said casing an inlet and an outlet, said sleeve having ribs forming flutes on its inner face, ribs terminating in a radially extending shoulder, a worm rotatably mounted in said sleeve and cooperating with said ribs to advance food particles from said inlet to said outlet, a disk fixed to said casing at the outlet having perforations predetermined as to size according to the fineness of the food to be comminuted, there being a space constituting a mixing chamber between the shoulder and the disk, a rotary cutter fixed to said worm and having cutting teeth at its outer edge engaging said shoulder to shear the food particles being advanced without squeezing the same when they emerge from said flutes, and a mixing member anchored to rotate with said worm and having intersecting arms to mix the food particles as they pass between said cutter and said disk.

5. The combination as set forth in claim 4 in which an annular recess is formed on the sleeve in front of said shoulder to form an axially extending bearing face while said shoulder forms an end thrust bearing face, the inner rear faces axially of the teeth of said cutter bearing against said end thrust bearing face and the outer periphery of the teeth of said cutter bearing against said axially extending bearing face.

6. The combination as set forth in claim 4 in which there is an annular recess formed on said sleeve in front of said shoulder forming an outwardly flaring face and an axially extending bearing face between said flaring face and said shoulder and the shoulder forms an end thrust bearing face, the inner rear faces axially of the teeth of said cutter bearing against said end thrust bearing face and the outer peripheral edges of the teeth of said cutter bearing against said axially extending bearing face, and the flaring face serving to facilitate assembly.

7. The combination of a casing, a sleeve secured to said casing and forming with said casing an inlet and an outlet, said sleeve having ribs forming flutes on its inner face, ribs terminating in a radially extending shoulder, a worm rotatably mounted in said sleeve and cooperating with said ribs to advance food particles from said inlet to said outlet, a disk fixed to said casing at the outlet having perforations predetermined as to size according to the fineness of the food to be comminuted, there being a space constituting a mixing chamber between the shoulder and the disk, a first rotary cutter fixed to said worm and having cutting teeth at its outer edge conforming substantially in radial extent to the radial extent of the ribs engaging said shoulder to shear the food particles being advanced without squeezing the same when they emerge from said flutes, and a second cutter anchored to rotate with said worm and having intersecting arms spaced from said first cutter and engaging the inner face axially of said disk to mix the food particles as they pass said first cutter and further shear the same as they pass through said disk.

8. The combination of a casing having an inlet and an outlet, said casing having ribs forming flutes on its inner face terminating in cutting edges, a worm rotatably mounted in said casing and cooperating with said ribs to advance food particles from said inlet to said outlet, a disk at the outlet having perforations predetermined as to size according to the fineness to which the food is to be comminuted, there being a space constituting a mixing chamber between the cutting edges and the disk, a first cutter having cutting teeth at its outer edge engaging said cutting edges to shear the food particles being advanced, a second cutter cooperating with the inner face of said disk, and a connecting means for fixedly securing said first cutter to said worm and having a non-circular seat to receive said second cutter to enable the second cutter to rotate with said worm and be free to be slidably removed from said connecting means after said disk has been removed from said casing.

9. A meat chopper having a casing providing a passage, a perforated plate fixed in the end of the passage and rotary cutting blades in contact with the face of the perforated plate, characterized by means for feeding the meat to said perforated plate in the form of small ragged uncompressed pieces, such means including longitudinal ribs on the wall of the passage terminating in cutting edges at a distance from the end of the passage, a rotary feed worm located within the ribbed portion of the passage, a rotary cutter located at the longitudinally outer end of the ribbed portion of the passage and having peripheral teeth coacting with the cutting edges formed by the ends of the ribs to shear the meat and separated by recesses communicating with the helical trough in the feed worm and at least as deep as said trough, and said rotary blades constituting a rotary mixer within the unribbed end of the passage between said longitudinal ribs and said perforated plate.

PETER M. SIVERTSEN.

REFERENCES CITED

The following references are of record in the file of this patent:

UNITED STATES PATENTS

| Number | Name | Date |
|---|---|---|
| 366,706 | Williams | July 19, 1887 |
| 388,940 | Williams | Sept. 4, 1888 |
| 473,166 | Shepard | Apr. 19, 1892 |
| 593,948 | Mosher | Nov. 16, 1897 |
| 1,479,380 | Edwards | Jan. 1, 1924 |
| 2,075,603 | Dirr | Mar. 30, 1937 |
| 2,090,650 | Vant | Aug. 24, 1937 |
| 2,218,119 | McAllister | Oct. 15, 1940 |

FOREIGN PATENTS

| Number | Country | Date |
|---|---|---|
| 7,627 | Great Britain | June 7, 1886 |
| 122,518 | Germany | July 26, 1901 |